Dec. 20, 1960 — F. J. MAZUR — 2,964,999
REAR VIEW MIRROR ASSEMBLY
Filed Dec. 31, 1953 — 2 Sheets-Sheet 1
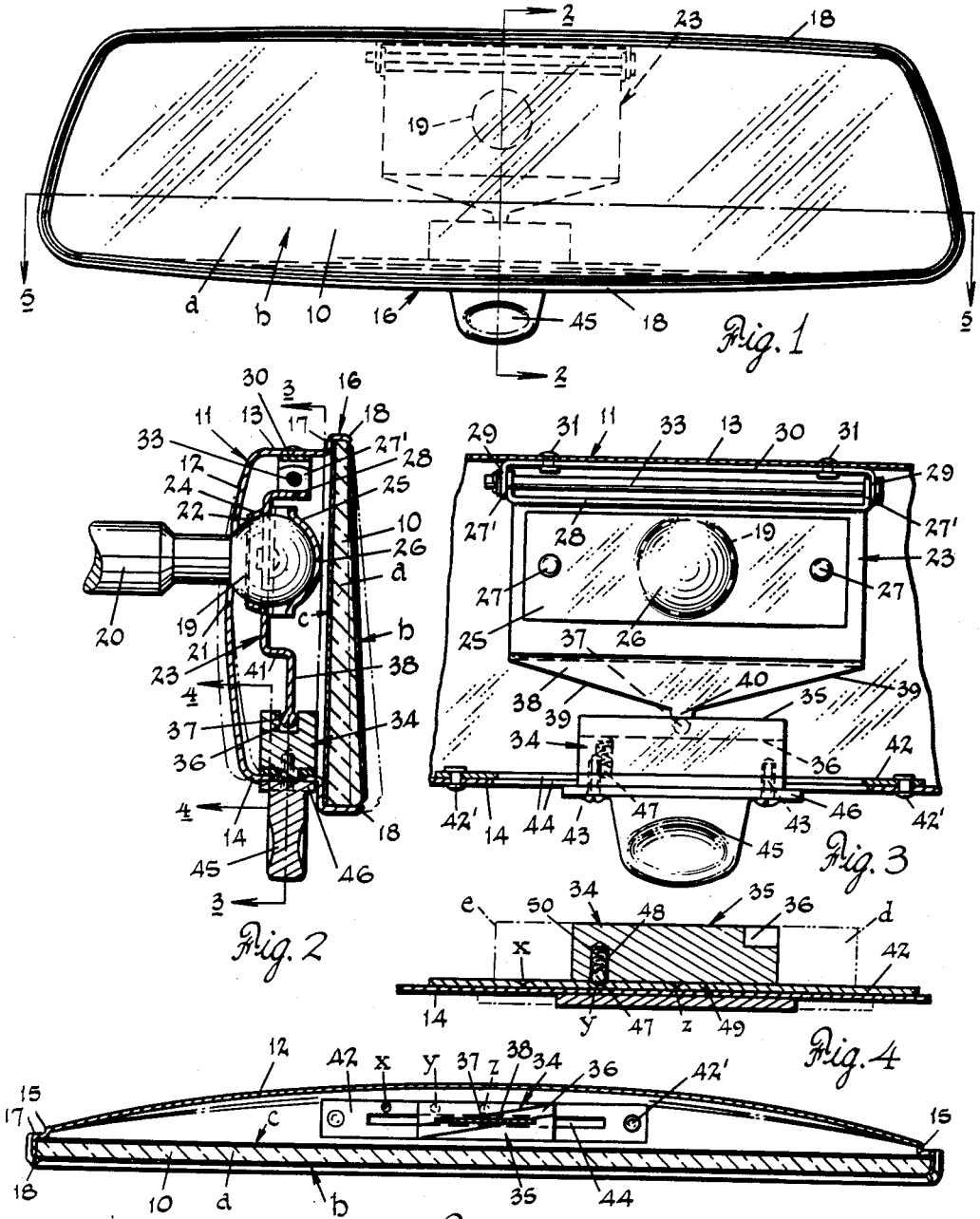
INVENTOR.
Ferdinand J. Mazur
BY Nobbe & Swope
ATTORNEYS Dec. 20, 1960  F. J. MAZUR  2,964,999
REAR VIEW MIRROR ASSEMBLY
Filed Dec. 31, 1953
2 Sheets-Sheet 2
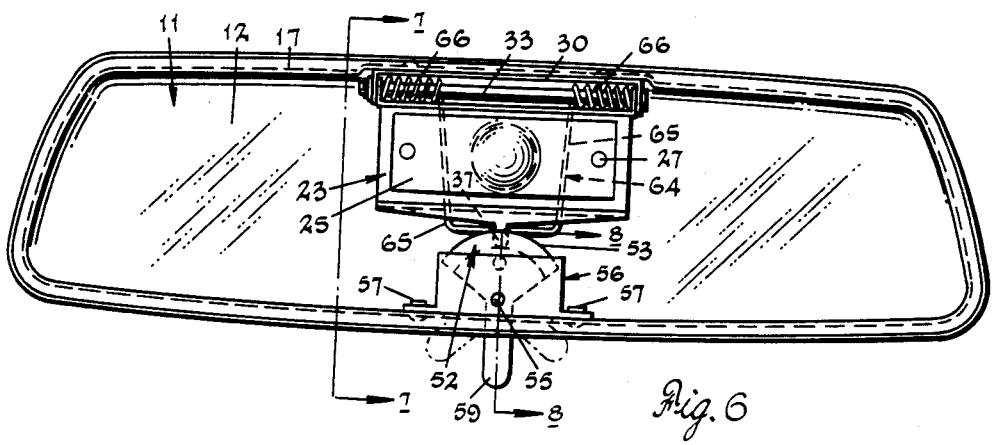
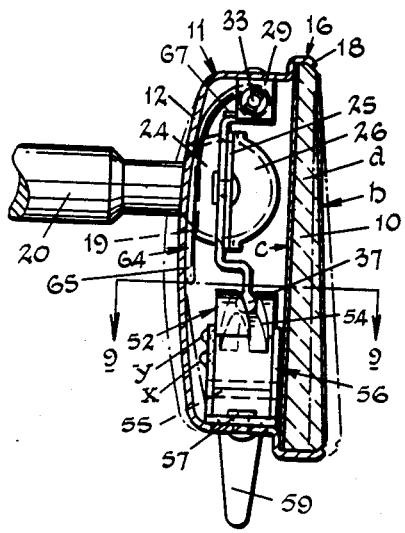
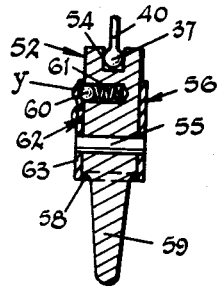
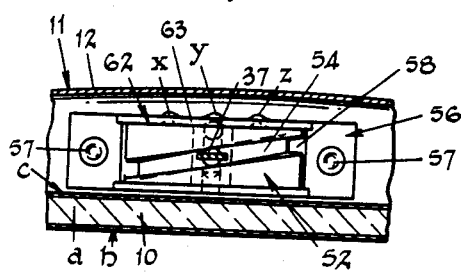
INVENTOR.
Ferdinand J. Mazur
BY
Nobbe & Swope
ATTORNEYS

United States Patent Office 2,964,999
Patented Dec. 20, 1960

2,964,999

REAR VIEW MIRROR ASSEMBLY

Ferdinand J. Mazur, Natrona Heights, Pa., assignor to Libbey-Owens-Ford Glass Company, Toledo, Ohio, a corporation of Ohio Filed Dec. 31, 1953, Ser. No. 401,491

3 Claims. (Cl. 88—77)

The present invention relates to improvements in rear view mirrors for automobiles and the like.

The primary purpose in the use of a rear view automobile mirror is of course to provide the driver with a satisfactory view of the rear road under the various conditions of driving. For example, in Patent No. 2,631,498, issued March 17, 1953, to Dwight W. Barkley there is disclosed a prismatic rear view mirror which provides the automobile driver with a personal selection of three or more intensities of images of the rear road conditions. Such a mirror permits the driver to make a choice of images of various brightness, each image being of the common limited rear field of view so as to obtain maximum visibility with the minimum eye glare best suited to his particular personal eye glare tolerance and visual acuity under all the varying light intensities present under modern night and day driving conditions.

In the above patent, the choice of image intensity suitable to the driver is made by his selectively positioning the prismatic rear view mirror by angular adjustment to alternately locate the various images of differing intensities of the same limited common rear field of view in the normal line of sight of the driver as he sits in driving position in the car. Thus, the rear view mirror provides a choice of at least three image intensities which may be, for example, of over 30%, between 10% and 30% approximately, and of over 4.5% up to 12% approximately of the incident light falling upon the rear view mirror and coming from the rear view of the road, etc.

An important object of this invention is the provision of a prismatic rear view mirror of the general type disclosed in the above patent embodying novel and improved means for mounting and angularly adjusting the mirror to predetermined positions to selectively locate any one of three different image intensities of the same limited common rear field of view in the normal line of sight of the driver.

Another object of this invention is the provision of such a rear view mirror embodying simple yet effective means by which the driver may angularly adjust the mirror to predetermined positions at will to selectively locate in the predetermined position of the driver's eyes the first, second and third images of the common rear field of view.

Another object of the invention is the provision of such a rear view mirror which can be readily and conveniently tilted upwardly and downwardly by the driver within a controlled arc to bring any one of the three images of various intensities into the line of vision of the driver, and including means for insuring maintenance of the mirror in selected position.

A further object of the invention is the provision of such a rear view mirror embodying means enabling tilting movement of the mirror to any one of three positions by finger tip control to give the desired intensity of image, without disturbing the adjustment of the mirror in relation to the driver, and for effectively maintaining the mirror in selected position.

A still further object of the invention is the provision of cam actuated means by which shifting of the mirror to its different positions may be easily and quickly effected with a minimum of effort and attention on the part of the driver, together with means coacting with said actuating means for positively locating the mirror in its selected position and for preventing accidental displacement therefrom.

Other objects and advantages of the invention will become more apparent during the course of the following description when taken in connection with the accompanying drawings.

In the drawings wherein like numerals are employed to designate like parts throughout the same:

Fig. 1 is a front elevation of one form of rear view mirror constructed in accordance with the invention;

Fig. 2 is a vertical sectional view taken substantially on line 2—2 of Fig. 1;

Fig. 3 is a fragmentary sectional view taken substantially on line 3—3 of Fig. 2;

Fig. 4 is a sectional view of the cam actuating means taken substantially on line 4—4 of Fig. 2;

Fig. 5 is a horizontal sectional view through the rear view mirror taken substantially on line 5—5 of Fig. 1;

Fig. 6 is a front elevation of a modified form of the invention with the mirror element removed;

Fig. 7 is a vertical sectional view taken substantially on line 7—7 of Fig. 6 but including the mirror element;

Fig. 8 is a detail sectional view of a modified cam actuating means taken substantially on line 8—8 of Fig. 6; and Fig. 9 is a partial horizontal sectional view of the case showing the cam actuating means taken substantially on line 9—9 of Fig. 7.

With reference now to the drawings and particularly to Figs. 1 to 5, there is disclosed a mirror element 10 which comprises a support body *a* of glass or other transparent material which is wedge shaped in vertical cross section and is provided with front and rear reflecting surfaces *b* and *c* respectively in the form of coatings arranged one behind the other, with either their lower or upper edges in converging relationship and with the other edges more widely spaced apart. Thus, the mirror reflective means or coatings may be arranged upon a prism which may be of glass or plastic and disposed in non-parallel relationship or upon sheets of the same arranged in prism form.

The angle between the two mirror reflective coatings *b* and *c* which form a front mirror and a rear mirror is preferably of the order of three and one-fourth degrees, although, there may readily be used an angular separation between the two mirrors of from two to ten degrees or more, the larger angular separation of close to ten degrees being preferable when a prism composed of glass sheets is used.

By way of example, the back surface of the support body *a* may carry a highly reflective mirror film *c* which, as a coating on a plane sheet of glass, would have a reflectivity preferably ranging from 50% to 95% or more and which is preferably opaque. On the other hand, the front surface of the support body may carry a reflective film means *b* which is preferably semi-transparent, of substantially no light absorption, and has a reflectivity of 10% to 30% for use in normal night driving and in daytime driving under snow and sun glare conditions.

According to the invention, the mirror element 10 is carried by a substantially rectangular housing or case 11 having a back wall 12, top wall 13, bottom wall 14 and opposite end walls 15. The case is open at the front and has a forwardly directed peripheral flange 16 therearound which overlies the edges of the mirror element and serves to hold it rigidly in position to close the front of the case. As will be seen in Fig. 2, the flange 16 includes a substantially vertical wall portion 17 which engages the rear surface of the mirror element to hold it against rearward displacement, and a bent forward edge portion 18 which engages corresponding beveled edge portions of the mirror element to hold it against forward displacement.

To provide for mounting the mirror in a vehicle so that it may be bodily adjusted to properly locate the reflecting surfaces b and c for different drivers, the case 11 is carried on a truncated ball 19 provided at the outer end of a supporting arm 20, the opposite end of said arm terminating in a threaded stud or the like, not shown, by which the mirror may be fixedly secured in position in the automobile.

The ball 19 extends through an opening 21 in the back wall 12 of case 11 and also through a complementary opening 22 in a substantially vertical stationary support plate 23, being mounted in a spherical seat or bearing 24 formed therein. The ball is held in the seat 24 by a metal strap 25 having a substantially centrally formed bearing portion 26 conforming to and engaging said ball. The metal strap 25 is suitably secured at its opposite ends to the support plate 23 as indicated at 27 and serves to secure the said plate to said ball. In use, the support plate 23 and strap 25 coact to grip the ball 19 with sufficient pressure to maintain the said support plate stationary except when the mirror is adjusted bodily as a unit with respect to the ball to position it for different drivers.

The case 11 is hingedly carried by the support plate 23 by means of tabs 27' bent upwardly from the forwardly directed upper edge portion 28 of said support plate; said tabs being arranged so as to overlie the down-turned complementary tabs 29 formed at opposite ends of a hinge bracket 30 secured to the top wall 13 of the case 11 by rivets or other suitable means 31. The tabs 27' and 29 are provided with aligned openings through which is passed a horizontal pintle 33 by which the case 11 is hingedly attached to the stationary support plate 23. This hinge connection between the case 11 and support plate 23 enables tilting of the case and mirror carried thereby as a unit upwardly or downwardly relative to said stationary support plate to obtain the desired image intensity.

The desired tilting of the mirror is effected by a horizontally slidable cam block 34 arranged within the case and slidably mounted on the lower wall 14 thereof. More particularly, the cam block 34 is substantially rectangular in shape and is provided in its upper face 35 with a longitudinally extending diagonal cam slot 36 which preferably extends from one end of the cam block to the other. Received within the cam slot 36 is a cam follower preferably in the form of a ball 37 which is carried at the lower end of a leg 38 depending from the support plate 23. Specifically, the depending leg 38 has tapered sides 39 which converge to form a narrow tab 40 on which the cam follower ball 37 is held. For the purpose of compactness, the leg 38 is preferably displaced laterally from the support plate proper, in parallel relation thereto, by a right angle bend 41, which results in the follower ball 37 being positioned directly over the cam slot 36.

The cam block 34 is mounted to slide back and forth in a longitudinal direction on a bearing plate 42 secured to the bottom wall 14 of the case by rivets or the like 42' while, at the same time, it is restrained from any lateral sidewise motion by vertical screws or pins 43 which project through aligned narrow slots 44 in the plate 42 and bottom wall 14 of the case and connect said cam block to an actuator knob or finger grip 45 arranged below the case. As best seen in Fig. 3, the actuator knob is provided with a bearing plate 46 beneath and contacting the lower wall 14 of the case to facilitate sliding movement of the actuator knob back and forth over the exterior surface of said lower wall.

In use, when it is desired that the mirror element 10 be tilted to a different reflective position because of changing light conditions, the actuator knob 45 is slid along the case which in turn slides the cam block 34 to the right or left to either of the phantom line positions d or e shown in Fig. 4. This movement of the cam block causes the cam slot 36, which is diagonal to the path of travel of said cam block, to engage the cam follower ball 37 on support plate 23 and cause the case 11 and mirror element 10 to be pivoted angularly about the hinge pintle 33 to either the broken line or solid line positions illustrated in Fig. 2 to place the mirror element in the desired reflective position.

As pointed out hereinabove, the mirror of this invention can be selectively adjusted to three reflective positions. To accomplish this, and also to make certain that the exact reflective position is obtained, there is provided a stop means which functions to locate the mirror in desired position in a positive manner. As will be seen in Figs. 3 and 4, this stop means consists of a spring loaded ball 47 located within a hole 48 drilled in the bottom face 49 of the cam block 34 and backed up by a spring 50. When the cam block is moved longitudinally to tilt the mirror, the ball 47 is adapted to selectively engage three depressions x, y and z in the bearing plate 42 to properly locate the mirror and yieldably restrain accidental movement of the cam block.

In using the depressions to help locate the mirror in the desired reflective position, the driver of the automobile will move the actuator knob 45 in one direction or the other in a longitudinal direction along the bottom of the case until he feels or hears a click which will indicate to him that the spring loaded ball has engaged one of the depressions in the bearing plate and that the mirror is in proper reflective position with regard to viewing objects to the rear of the automobile. Should the mirror not be in the position best suited to the prevailing light conditions, he may then move the actuator knob to cause the spring loaded ball to engage either of the two remaining depressions in the same manner to angularly adjust the mirror to the best reflective position.

Reference is now made to Figs. 6 to 9 wherein there is illustrated another embodiment of the invention in which the principal difference is the actuating means for tilting the mirror. As herein shown, such means comprises a pivoted cam 52 having a semi-circular or arcuate face 53 in which is formed an arcuate groove 54 extending diagonally across the cam face 53 and corresponding to the arcuate shape of said face. The cam 52 is pivotally mounted on a horizontal pivot pin 55 carried by a substantially U-shaped bracket member 56 attached to the bottom wall 14 of the case by rivets or the like 57. This form of the invention also embodies a stationary support plate 23 provided with a cam follower ball 37 which is received in the groove 54 of cam 52. The bracket member 56 has a slot 58 in the bottom thereof which aligns with a corresponding slot in the bottom wall of the case to receive a finger actuator arm 59 which is preferably integral with the cam 52 and projects downwardly beneath the case where it can be readily engaged by the driver of the automobile.

Like the cam slot 36 in the embodiment of Figs. 1 to 5, the arcuate cam slot 54 in cam 52 engages the cam follower ball 37 on the support plate 23 so that, upon pivotal movement of the actuating arm 59, the cam 52 will tilt the case 11 and mirror element 10 angularly about the hinge pintle 33 to one of the three beforementioned positions. Upon being located in the desired reflective position, the mirror will be maintained in such position against accidental movement by a spring loaded ball 60 carried within a transverse recess 61 in the side 62 of the cam and which selectively engages one of three depressions x, y and z formed in the side 63 of the bracket member 56 upon tilting of said mirror.

To maintain the cam follower 37 in bearing contact with the wall of the cam slot 54 at all times, there is provided a U-shaped spring 64 which engages both the case 11 and support plate 23. Specifically, the spring comprises a U-shaped portion 65 which engages the back wall 12 of the case and is provided at its opposite ends with coils 66 wound around the pintle 33, the ends of said coiled portions engaging the forwardly directed edge portion 28 of the support plate 23 as indicated at 67 in Fig. 7. In this way, the spring acts to bias the back of the case away from the support plate 23 towards the front of the automobile so as to maintain a close bearing relationship between the cam 52 and the follower ball 37 thus making the case instantaneously responsive to any pivotal movement of the cam 52.

When using either embodiment of the invention above described, the case 11 together with the support plate 23 are first adjusted upon the supporting ball 19 to the proper angular position for the driver of the automobile, after which the mirror element is tilted upon the horizontal axis defined by the pintle 33 to selectively bring any one of the three reflective light beams, as discussed in the Barkley Patent No. 2,631,498, to the driver's eyes. This tilting of the mirror can be easily and quickly effected by movement of the finger actuator knob 45 or the actuating arm 59 in the proper direction with the exercise of little or no care or attention on the part of the driver. Then, as the spring loaded ball 47 or 60 engages one of the depressions $x$, $y$, or $z$, such engagement will be sensed by the driver and will indicate to him that a reflective surface of the mirror is in a proper reflecting position. While this tilting of the mirror is taking place, the position of the mirror upon the ball 19 will not be affected as the metal strap 25 which engages the ball and forces it against its seat 24 is sufficient to maintain the support plate substantially rigid in its pre-adjusted position.

While the mirror mounting described herein provides for the adjustment of the mirror element to give three different light intensities of images of the road to the rear of the automobile, it will be evident that this mounting may also be used to support and adjust a two position mirror.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In a rear view mirror for automobiles, a case having an opening at the front thereof, a mirror element secured in and closing said opening, said mirror element serving to reflect images of different intensities when moved with respect to the object being reflected and having front and back surfaces which are disposed at an angle to one another, with a mirror coating provided on at least said back surface, a support plate inside said case and spaced from said mirror, means carried by the support plate for attachment to an automobile, and cam means for rocking said case and mirror element, said cam means having an arcuate face portion with an arcuate slot therein receiving a portion of said support plate, and actuating means for actuating said cam means to rock said case and mirror element as a unit relative to said support plate.

2. In a rear view mirror for automobiles, a case having a back wall and an opening in the front thereof, a mirror element secured in said opening and spaced from said back wall, said mirror element serving to reflect images of different intensities when moved with respect to the object being reflected and having front and back surfaces which are disposed at an angle to one another, with a mirror coating being provided on at least said back surface, a support plate within the case between said back wall and said mirror element and spaced from said mirror element, means carried by the support plate to connect said plate to an automobile, means pivotally attaching said case to said support plate, a leg member extending from said support plate, actuating means movably carried by said case, said actuating means having a slot therein positioned so as to receive a portion of said leg member in said slot during movement of the actuating means relative to said leg member, said actuating means being mounted for movement at an angle to the direction of movement of the pivotally mounted case so as to coact with said leg member to tilt said case and mirror element stepwise as a unit relative to said support plate to different angular locations about said pivotal attaching means to bring the mirror surfaces to definite selected positions to reflect to the same point images of different intensities, and means cooperating with said actuating means for locating and maintaining the case and mirror element in the desired tilted position.

3. In a rear view mirror for automobiles as claimed in claim 2, in which said actuating means includes means carried by the case and slidable thereon for rocking said case and mirror element relative to said support plate.

References Cited in the file of this patent

UNITED STATES PATENTS

| 2,052,770 | Hofer | Sept. 1, 1936 |
| 2,420,259 | McNamara | May 6, 1947 |
| 2,469,207 | Roedding | May 3, 1949 |
| 2,504,386 | Brady | Apr. 18, 1950 |